(12) United States Patent  
Doi et al.

(10) Patent No.: US 7,978,053 B2
(45) Date of Patent: Jul. 12, 2011

(54) TAG-INFORMATION MANAGEMENT APPARATUS AND IC TAG

(75) Inventors: Masashi Doi, Kawasaki (JP); Akira Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 11/214,031

(22) Filed: Aug. 30, 2005

(65) Prior Publication Data

US 2006/0255919 A1 Nov. 16, 2006

(30) Foreign Application Priority Data

May 10, 2005 (JP) .................................. 2005-137462

(51) Int. Cl.
*H04Q 5/22* (2006.01)
(52) U.S. Cl. .................................................... 340/10.51
(58) Field of Classification Search ............... 340/10.51, 340/572.1, 568.4, 825, 10.42, 10.3; 235/449, 235/450, 451
See application file for complete search history.

(56) References Cited

U.S. PATENT DOCUMENTS

| | | | | | |
|---|---|---|---|---|---|
| 5,469,363 | A | * | 11/1995 | Saliga | 700/225 |
| 5,500,651 | A | * | 3/1996 | Schuermann | 342/42 |
| 6,784,789 | B2 | * | 8/2004 | Eroglu et al. | 340/10.6 |
| 6,917,291 | B2 | * | 7/2005 | Allen | 340/572.1 |
| 7,142,115 | B2 | * | 11/2006 | Waters | 340/572.1 |
| 2005/0092838 | A1 | * | 5/2005 | Tsirline et al. | 235/449 |
| 2006/0001527 | A1 | * | 1/2006 | Dvorak et al. | 340/10.3 |
| 2006/0068711 | A1 | * | 3/2006 | Chiu et al. | 455/67.7 |

FOREIGN PATENT DOCUMENTS

| | | |
|---|---|---|
| JP | 6-350516 | 12/1994 |
| JP | 7-107031 | 4/1995 |
| JP | 09-224499 A | 9/1997 |
| JP | 2001-013243 A | 1/2001 |
| JP | 2001-060910 A | 3/2001 |
| JP | 2004-053510 A | 2/2004 |

OTHER PUBLICATIONS

Japanese Office Action dated Dec. 21, 2010, issued in corresponding Japanese Patent Application No. 2005-137462.

* cited by examiner

*Primary Examiner* — Brian A Zimmerman
*Assistant Examiner* — Nabil H Syed
(74) *Attorney, Agent, or Firm* — Westerman, Hattori, Daniels & Adrian, LLP

(57) ABSTRACT

An apparatus for managing information about an integrated circuit tag includes an acquiring unit and a storing unit. The acquiring unit acquires communication range information that is information about a range in which the integrated circuit tag communicates with an antenna of a reader/writer. The integrated circuit tag includes a transmitting device that transmits position identification information for identifying a position of the integrated circuit tag. The storing unit stores the communication range information in association with antenna identification information and integrated-circuit-tag identification information.

2 Claims, 5 Drawing Sheets

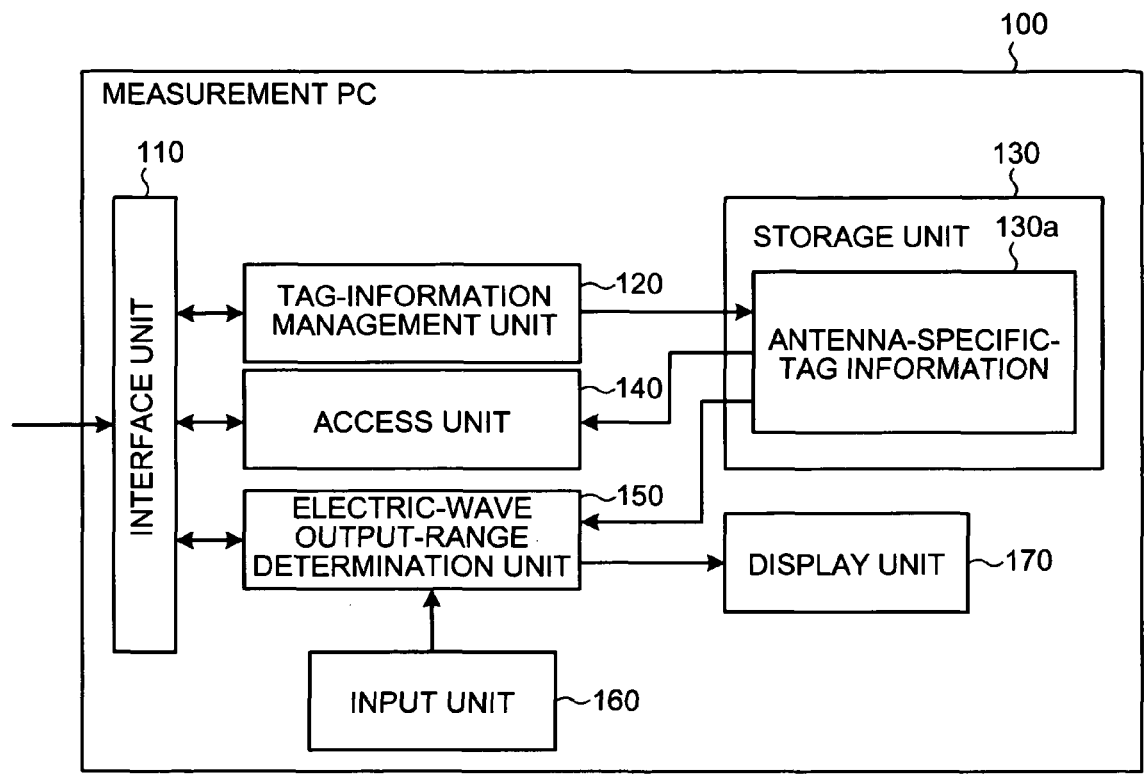

TAG-INFORMATION MANAGEMENT APPARATUS AND IC TAG

BACKGROUND OF THE INVENTION

1. Field of the Invention

The present invention relates to a technology for judging whether a range in which an IC tag communicates with a reader/writer is appropriate.

2. Description of the Related Art

In the conventional technology, at the time of installing an enterprise system using noncontact radio-frequency-identification (RFID) tags (hereinafter, "IC tags"), IC tags are located at positions within a range of receiving electric waves output by an antenna of a reader/writer (hereinafter, "electric-wave output range").

Accordingly, a worker installing the IC tags estimates the electric-wave output range based on past experience and intuition, and locates each IC tag within the range estimated. Japanese Patent Application Laid Open No. H6-350516 discloses a technology for accurately measuring positions at which IC tags are set.

However, in the conventional technology, an electric-wave output range cannot be accurately identified, because it is estimated based on a worker's experience and intuition.

Specifically, the electric-wave output range is largely and irregularly affected by an environment surrounding the antenna and the IC tags. The worker cannot take this into consideration.

Moreover, the process of setting IC tags within the electric-wave output range based on the worker's experience and intuition is performed by a trial-and-error method. This imposes a significant load on the worker.

SUMMARY OF THE INVENTION

It is an object of the present invention to at least solve the problems in the conventional technology.

According to an aspect of the present invention, an apparatus for managing information about an integrated circuit tag includes an acquiring unit that acquires communication range information, that is information about a range in which the integrated circuit tag communicates with an antenna of a reader/writer, where the integrated circuit tag includes a transmitting device that transmits position identification information for identifying a position of the integrated circuit tag; and a storing unit that stores the communication range information in association with antenna identification information for identifying the antenna, and integrated-circuit-tag identification information for identifying the integrated circuit tag.

According to another aspect of the present invention, an integrated circuit tag that stores information received from a reader/writer includes a transmitting unit that transmits position identification information for identifying a position of the integrated circuit tag; an acquiring unit that acquires communication range information that is information about a range in which the integrated circuit tag communicates with an antenna of the reader/writer, where the communication range information is identified by the position identification information; and a storing unit that stores the communication range information.

According to still another aspect of the present invention, a method of managing information about an integrated circuit tag includes acquiring communication range information that is information about a range in which the integrated circuit tag communicates with an antenna of a reader/writer, where the integrated circuit tag includes a transmitting device that transmits position identification information for identifying a position of the integrated circuit tag; and storing the communication range information in association with antenna identification information for identifying the antenna, and integrated-circuit-tag identification information for identifying the integrated circuit tag.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a functional block diagram of a measurement PC shown in FIG. 1;

FIG. 3 is an example of antenna-specific-tag information;

DETAILED DESCRIPTION OF THE PREFERRED EMBODIMENTS

Exemplary embodiments of the present invention will be described below with reference to the accompanying drawings. The present invention is not limited to these embodiments.

A tag-information management device according to an embodiment of the present invention employs an IC tag including an ultrasonic transmitter (hereinafter, "transmitter-tag"). The tag-information management device acquires information regarding a range in which the IC tag and an antenna of a reader/writer communicate (hereinafter, "communication range information"), stores the acquired communication range information in a storage unit, and writes the communication range information into the transmitter-tag.

Accordingly, at the time of installing IC tags, a worker can easily acquire the communication range information from the transmitter-tag with a handy terminal for radio-frequency-identification (RFID). Thus, the worker can accurately identify an electric-wave output range, thereby reducing a load on the worker when installing IC tags.

Figure 1:
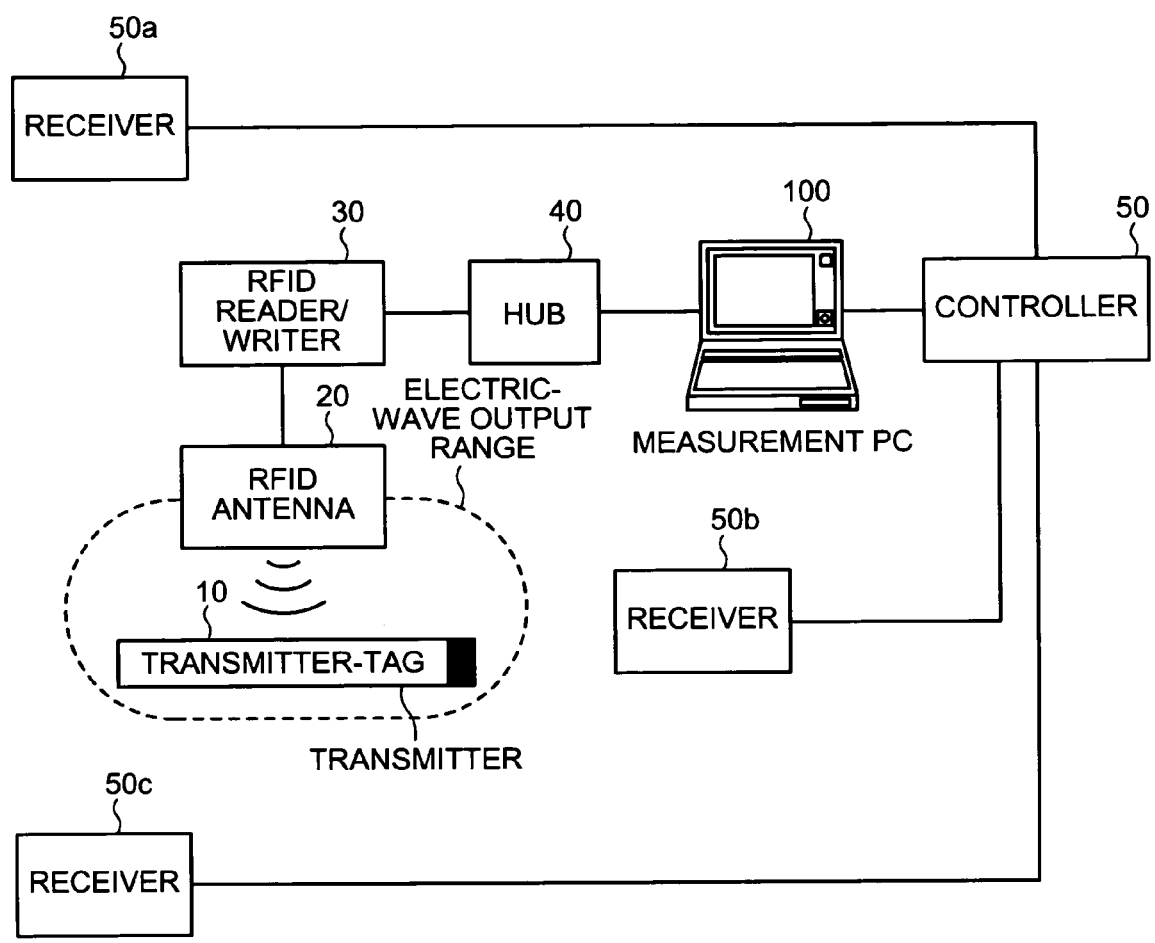
FIG. 1 is a block diagram of a tag-information management system according to an embodiment of the present invention.

FIG. 1 is a block diagram of a tag-information management system according to the embodiment. The tag-information management system includes a transmitter-tag 10, an RFID antenna 20, an RFID reader/writer 30, a hub 40, a controller 50, receivers 50a to 50c, and a measurement personal computer (PC) 100. The measurement PC 100 corresponds to the tag-information management device.

The RFID reader/writer 30 is connected to the RFID antenna 20 and the hub 40; the measurement PC 100 is connected to the hub 40 and the controller 50; and the controller 50 is connected to the receivers 50a to 50c.

The transmitter-tag 10 is an IC tag that stores communication range information transmitted by the RFID antenna 20. A transmitter attached to the transmitter-tag 10 transmits information (specifically, ultrasonic waves) for identifying a position of the transmitter-tag 10.

The RFID antenna 20 outputs electric waves to the transmitter-tag 10, and writes/reads information into/from the transmitter-tag 10. The RFID reader/writer 30 uses the RFID antenna 20 to write/read information in/from the transmitter-tag 10, in response to a read/write request from the measurement PC 100.

The hub 40 connects the RFID reader/writer 30 and the measurement PC 100 to enable communication between them. The controller 50 measures a three-dimensional position coordinate of the transmitter-tag 10 (hereinafter, "position coordinate") with the receivers 50a to 50c, and sends the position coordinate measured to the measurement PC 100. The position coordinate can be relative to an RFID tag, or an absolute position coordinate with respect to a specific location.

For example, the controller 50 causes the receivers 50a to 50c to receive ultrasonic waves transmitted by the transmitter-tag 10, and measures the position coordinate by trigonometry. Before the controller 50 measures the position coordinate, a worker of the tag-information management system sets the transmitter-tag 10 at a critical point corresponding to the electric-wave output range of the RFID antenna 20.

The measurement PC 100 uses the controller 50 to acquire communication range information, i.e. a position coordinate of the transmitter-tag 10. Specifically, the measurement PC 100 acquires a position coordinate, stores the position coordinate acquired, and writes the position coordinate in the transmitter-tag 10 via the RFID reader/writer 30. The measurement PC 100 acquires position coordinates of the transmitter-tag 10 at a plurality of locations corresponding to the critical points.

FIG. 2 is a functional block diagram of the measurement PC 100. The measurement PC 100 includes an interface unit 110, a tag-information management unit 120, a storage unit 130, an access unit 140, an electric-wave output-range determination unit 150, an input unit 160, and a display unit 170.

The interface unit 110 uses a predetermined communication protocol to communicate with the RFID reader/writer 30 and the controller 50. The tag-information management unit 120 acquires a position coordinate from the controller 50, acquires a tag identification (ID) for identifying the transmitter-tag 10, and an antenna ID for identifying the RFID antenna 20 from the RFID reader/writer 30, and stores the acquired information as the antenna-specific-tag information 130a in the storage unit 130.

FIG. 3 is an example of a data structure of the antenna-specific-tag information 130a. The antenna-specific-tag information 130a includes a tag ID, an antenna ID, and a position coordinate. For example, a tag ID "1001" has an antenna ID "2001" and a position coordinate "x=2.54, y=3.65, z=2.36". A plurality of position coordinates is stored for each combination of a tag ID and an antenna ID.

Accordingly, the tag-information management unit 120 acquires from the controller 50, position coordinates of the transmitter-tag 10 at a plurality of positions corresponding to the critical points, and stores the acquired position coordinates in the antenna-specific-tag information 130a. To acquire a plurality of position coordinates, a worker moves the transmitter-tag 10 to different locations.

The access unit 140 sends the antenna-specific-tag information 130a to the RFID reader/writer 30, and causes the RFID reader/writer 30 to write the antenna-specific-tag information 130a in the transmitter-tag 10. The access unit 140 can cause the RFID reader/writer 30 to write all information included in the antenna-specific-tag information 130a into the transmitter-tag 10, or only relevant information (e.g., information corresponding to the tag ID of the transmitter-tag 10).

The electric-wave output-range determination unit 150 determines whether an electric-wave output range of the RFID antenna 20 is appropriate. The electric-wave output-range determination unit 150 reads the antenna-specific-tag information 130a, and creates an approximation surface based on position coordinates having the same tag ID and the same antenna ID. The electric-wave output-range determination unit 150 stores a tag ID in association with an antenna ID, on which the approximation surface is based.

The electric-wave output-range determination unit 150 acquires once again from the controller 50, a tag ID of the transmitter-tag 10, an antenna ID of the RFID antenna 20, and apposition coordinate of the transmitter-tag 10. The electric-wave output-range determination unit 150 determines whether the acquired position coordinate is within a tolerance range with respect to the approximation surface, and outputs a result of this determination to the display unit 170. The display unit 170 displays information acquired from the electric-wave output-range determination unit 150 on a display device (not shown).

Figure 4:
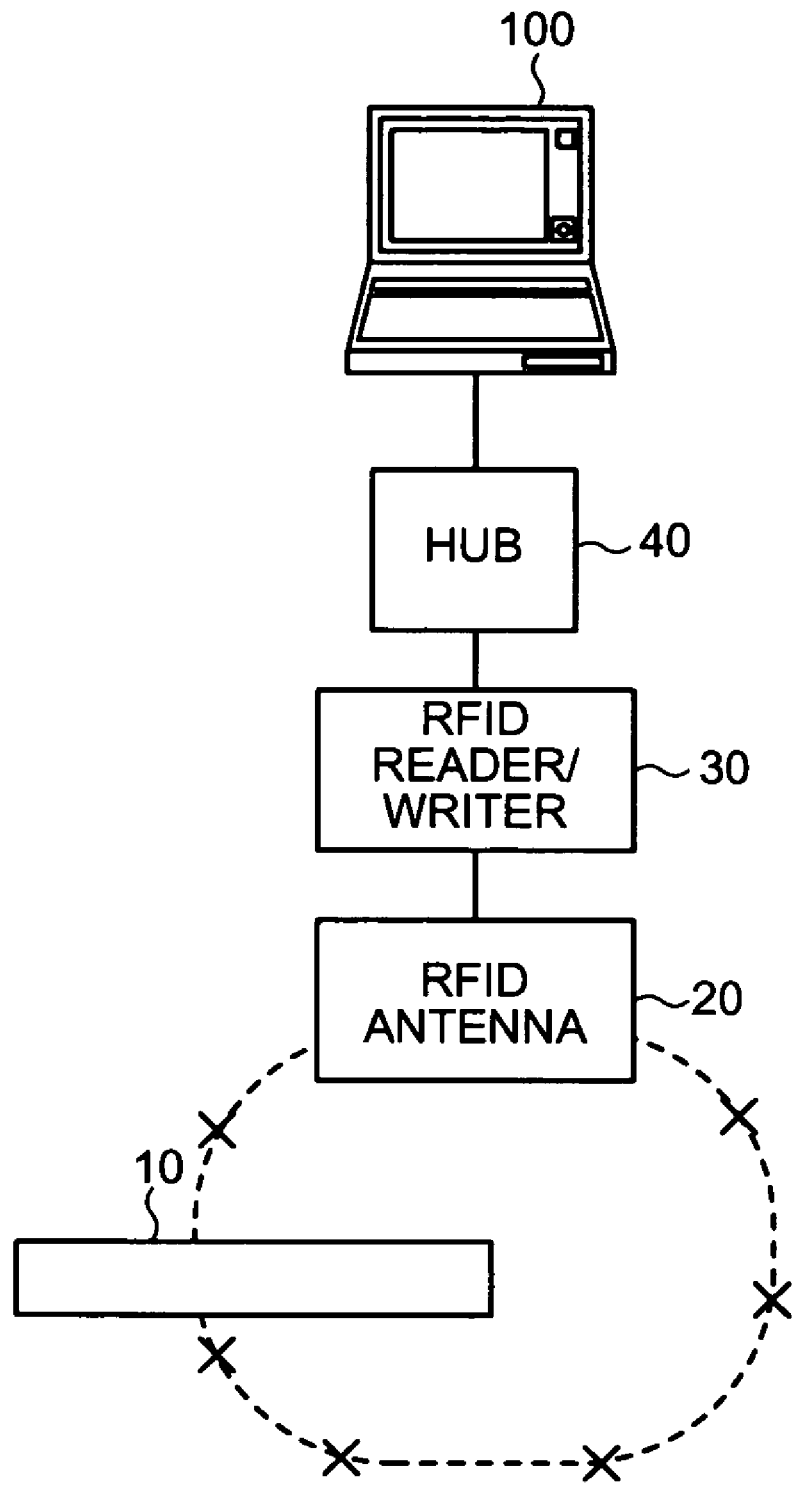
FIG. 4 is a diagram to explain a process performed by an electric-wave output-range determination unit shown in FIG. 2.

FIG. 4 is a diagram to explain a process performed by the electric-wave output-range determination unit 150. When maintenance is performed on the tag-information management system, a worker uses a handy terminal to acquire a position coordinate from the transmitter-tag 10, and locates the transmitter-tag 10 at a position corresponding to the acquired position coordinate. The worker inputs into the measurement PC 100, that the transmitter-tag 10 has been located at the position, using an input device such as a keyboard (not shown).

The electric-wave output-range determination unit 150 acquires information through the input unit 160 that the transmitter-tag 10 has been located at the position, and determines whether the electric-wave output range is appropriate. The input unit 160 passes information input from the keyboard to the electric-wave output-range determination unit 150. The worker locates the transmitter-tag 10 at a plurality of positions corresponding to position coordinates. At each position, the electric-wave output-range determination unit 150 determines whether the electric-wave output range is appropriate. By repeating this process, the worker can easily determine whether the electric-wave output range is appropriate.

A worker may also acquire a position coordinate through the measurement PC 100. In this case, the worker inputs a position coordinate request in the measurement PC 100 through an input device. Upon receiving the position coordinate request through the input unit 160, the electric-wave output-range determination unit 150 in the measurement PC 100 acquires the antenna-specific-tag information 130a from the storage unit 130, and outputs the acquired antenna-specific-tag information 130a on the display unit 170.

Figure 5:
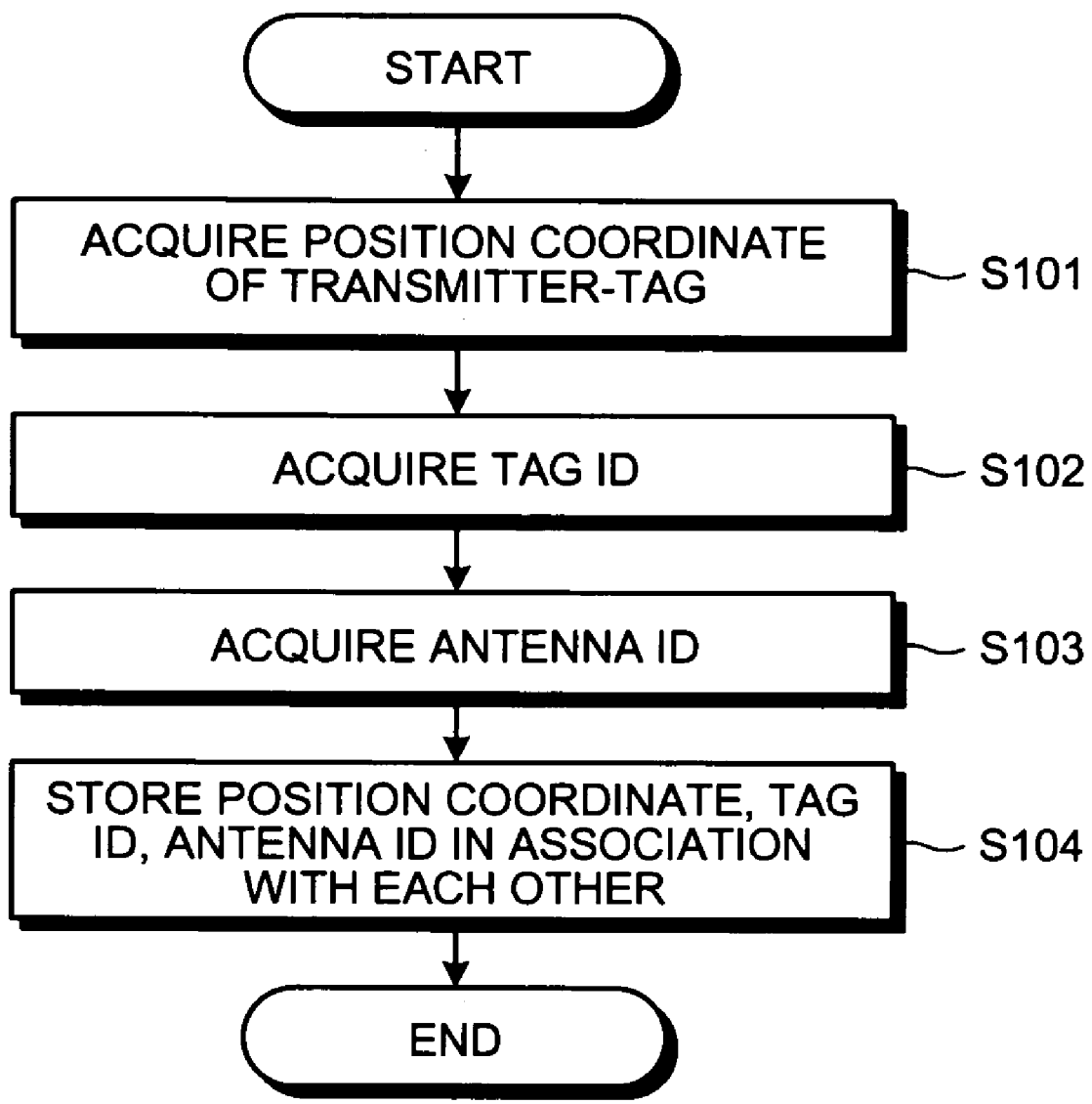
FIG. 5 is a flowchart of a process procedure performed by a tag-information management unit shown in FIG. 2.

FIG. 5 is a flowchart of a process procedure performed by the tag-information management unit 120. The tag-information management unit 120 acquires a position coordinate of the transmitter-tag 10 from the controller 50 (step S101).

The tag-information management unit 120 acquires a tag ID of the transmitter-tag 10 (step S102), and acquires an antenna ID of the RFID antenna 20 (step S103), from the RFID reader/writer 30.

The position coordinate, the tag ID, and the antenna ID are stored in association with each other as the antenna-specific-tag information 130a in the storage unit 130 (step S104).

Accordingly, a worker can easily identify an electric-wave output range using the antenna-specific-tag information 130a.

Moreover, because the access unit 140 writes the antenna-specific-tag information 130a into the transmitter-tag 10, a worker can acquire a precise electric-wave output range from the transmitter-tag 10 with the handy terminal. Thus, a load on the worker when installing IC tags reduces.

Figure 6:
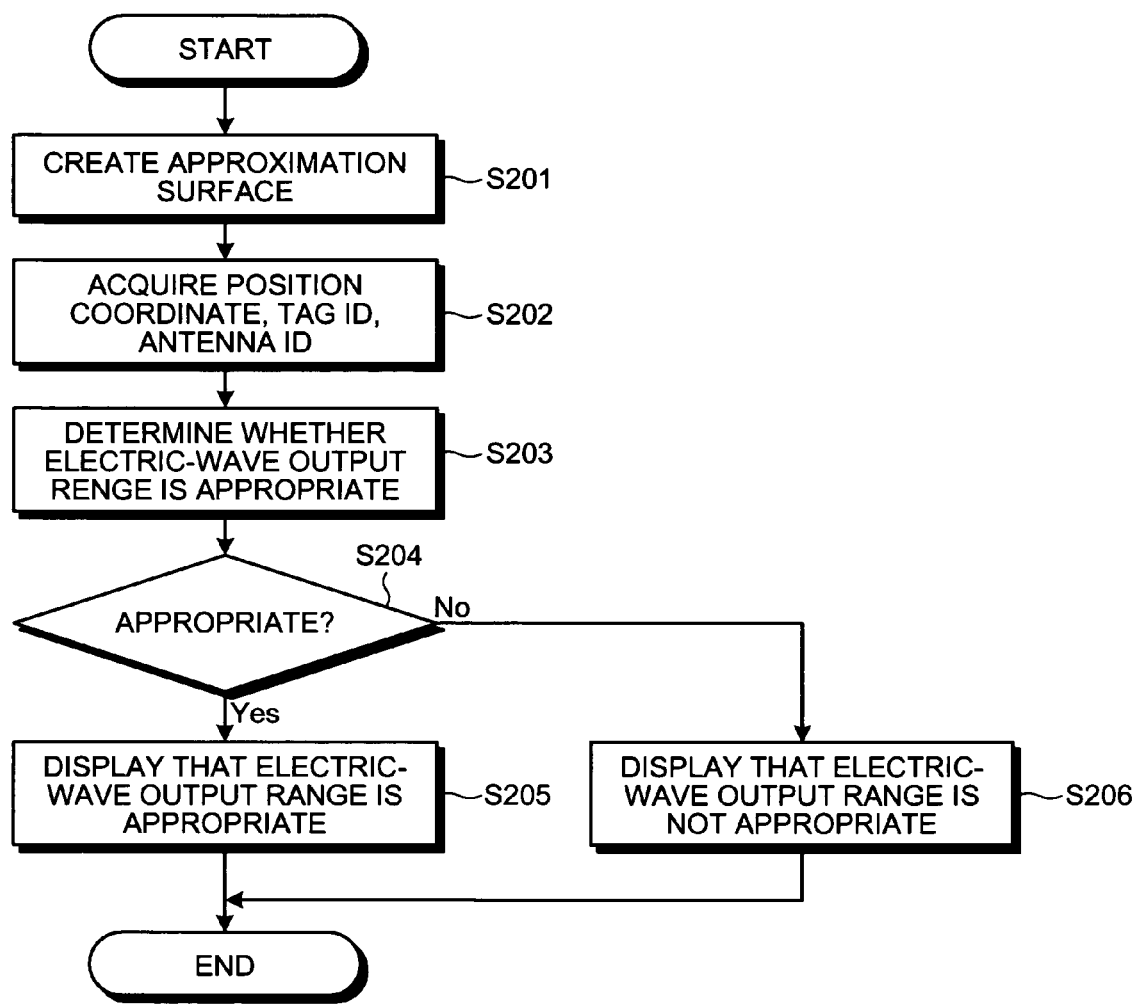
FIG. 6 is a flowchart of a process procedure performed by the electric-wave output-range determination unit.

FIG. 6 is a flowchart of a process procedure performed by the electric-wave output-range determination unit 150. The electric-wave output-range determination unit 150 creates an approximation surface based on position coordinates in the antenna-specific-tag information 130a (step S201). The electric-wave output-range determination unit 150 acquires a position coordinate from the controller 50, and acquires a tag ID and an antenna ID from the transmitter-tag 10 (step S202).

When the tag ID and the antenna ID on which the approximation surface is based match the tag ID and the antenna ID acquired from the transmitter-tag 10, the electric-wave output-range determination unit 150 compares the approximation surface and the position coordinate acquired from the controller 50, and determines whether the electric-wave output range is appropriate, i.e. whether the position coordinate is within a tolerance range with respect to the approximation surface (step S203).

If the electric-wave output range is appropriate (Yes at step S204), the electric-wave output-range determination unit 150 displays on the display device through the display unit 170 that the electric-wave output range is appropriate (step S205).

If the electric-wave output range is not appropriate (No at step S204), the electric-wave output-range determination unit 150 displays on the display device through the display unit 170 that the electric-wave output range is not appropriate (step S206).

Thus, a load on the worker when performing maintenance on the tag-information management system reduces.

The tag-information management unit 120 in the measurement PC 100 acquires a tag ID, an antenna ID, and a position coordinate, and stores this information as antenna-specific-tag information 130a in the storage unit 130. The access unit 140 stores the antenna-specific-tag information 130a in the transmitter-tag 10. Thus, a worker installing IC tags can easily identify a precise electric-wave output area.

In addition to the tag ID, the antenna ID, and the position coordinate, information regarding an environment in which the position coordinate is measured can be stored in the storage unit 130 as the antenna-specific-tag information 130a.

Thus, the electric-wave output range can be accurately identified regardless of irregular changes in the environment that affect the electric-wave output area.

According to the present invention, a worker who is installing tags can accurately identify a range to which electric waves are output from an antenna.

Furthermore, a worker who is installing tags can accurately identify a range in which electric waves are output from an antenna, so that IC tags are installed at appropriate positions.

Moreover, a worker can easily determine whether an electric-wave output range of an antenna is appropriate, so that a load on the worker when performing maintenance on the antenna reduces.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for managing information about an integrated circuit tag, comprising:
   an acquiring unit that acquires three-dimensional position coordinates of the integrated circuit tag located at a plurality of critical points each corresponding to a range of electric-wave output by an antenna of a reader/writer, from a controller that measures a three-dimensional position coordinate of the integrated circuit tag;
   a storing unit that stores the three-dimensional position coordinates acquired by the acquiring unit;
   an electric-wave outputting-range determination unit that creates an approximation surface based on the three-dimensional position coordinates in the storing unit, and compares the approximation surface and a three-dimensional position coordinate of an integrated circuit tag for locating, and determines whether the three-dimensional position coordinate of the integrated circuit tag for locating is within the approximation surface or not;
   a writing unit that writes the three-dimensional position coordinates in the storing unit into the integrated circuit tag; and
   a display unit that
      displays the integrated circuit tag for locating is within a tolerance range of electric-wave output by an antenna of a reader/writer when the three-dimensional position coordinate of the integrated circuit tag for locating is within the approximation surface, and
      displays the integrated circuit tag for locating is not within the tolerance range when the three-dimensional position coordinate of the integrated circuit tag for locating is not within the approximation surface.

2. A method of managing information about an integrated circuit tag, comprising:
   acquiring three-dimensional position coordinates of the integrated circuit tag located at a plurality of critical points each corresponding to a range of electric-wave output by an antenna of a reader/writer, from a controller that measures a three-dimensional position coordinate of the integrated circuit tag;
   storing the three-dimensional position coordinates acquired by the acquiring in the storing unit;
   creating an approximation surface based on the three-dimensional position coordinates in the storing unit;
   comparing the approximation surface and a three-dimensional position coordinate of an integrated circuit tag for locating;
   determining whether the three-dimensional position coordinate of the integrated circuit tag for locating is within the approximation surface or not;
   writing the three-dimensional position coordinates in the storing unit into the integrated circuit tag;
   displaying the integrated circuit to for locating is within a tolerance range of electric-wave output by an antenna of a reader/writer when the three-dimensional position coordinate of the integrated circuit tag for locating is within the approximation surface, and
   displaying the integrated circuit tag for locating is not within the tolerance range when the three-dimensional position coordinate of the integrated circuit tag for locating is not within the approximation surface.

* * * * *